United States Patent
Dross

(10) Patent No.: US 12,416,391 B2
(45) Date of Patent: Sep. 16, 2025

(54) COLLIMATOR AND PORTABLE LIGHTING DEVICE

(71) Applicant: LEDLENSER GMBH & CO. KG, Solingen (DE)

(72) Inventor: Oliver Dross, Hilden (DE)

(73) Assignee: LEDLENSER GMBH & CO. KG, Solingen (DE)

( * ) Notice: Subject to any disclaimer, the term of this patent is extended or adjusted under 35 U.S.C. 154(b) by 0 days.

(21) Appl. No.: 18/277,611

(22) PCT Filed: Mar. 15, 2022

(86) PCT No.: PCT/DE2022/100203
§ 371 (c)(1),
(2) Date: Aug. 17, 2023

(87) PCT Pub. No.: WO2022/214127
PCT Pub. Date: Oct. 13, 2022

(65) Prior Publication Data
US 2024/0125454 A1    Apr. 18, 2024

(30) Foreign Application Priority Data
Apr. 8, 2021 (DE) .................... 10 2021 108 747.3

(51) Int. Cl.
*F21V 5/00* (2018.01)
*F21L 4/00* (2006.01)
(Continued)

(52) U.S. Cl.
CPC .............. *F21V 5/004* (2013.01); *F21L 4/005* (2013.01); *F21V 7/0091* (2013.01);
(Continued)

(58) Field of Classification Search
CPC ........ F21V 5/002; F21V 5/004; F21V 7/0091; F21S 43/315; F21S 43/40; F21S 43/402; G02B 27/30
See application file for complete search history.

(56) References Cited

U.S. PATENT DOCUMENTS 8,641,230 B1 * 2/2014 Jiang .................. G02B 19/0061
                                                      264/1.7
11,300,270 B1 * 4/2022 Hong ..................... F21V 5/007
(Continued)

FOREIGN PATENT DOCUMENTS

CN         1918498 A  *  2/2007   ......... G02B 19/0066
DE   102008027234 A1  * 12/2009   ................ F21V 5/04
(Continued)

OTHER PUBLICATIONS

Machine translation of WO-2013154098-A1 retrieved from the FIT database of PE2E search. (Year: 2024).*
(Continued)

*Primary Examiner* — Colin J Cattanach
(74) *Attorney, Agent, or Firm* — McGlew and Tuttle, P.C.

(57) ABSTRACT

A collimator (1) for collimating light uses a plurality of optical surfaces each forming optical boundary surfaces with a change in the optical density. The collimator (1) has a substantially flat light entry surface (2), a convex light exit surface (4) and a totally reflective side wall (3) connecting the light entry surface (2) to the light exit surface (4). A portable lighting device is provided having such a collimator. In order to provide a collimator and a portable lighting device having a collimator which achieves a better light distribution, the light exit surface of the collimator has light-refracting structures (5).

22 Claims, 5 Drawing Sheets

(51) Int. Cl.
  *F21S 41/32* (2018.01)
  *F21S 43/31* (2018.01)
  *F21S 43/40* (2018.01)
  *F21V 7/00* (2006.01)
  *G02B 3/00* (2006.01)
  *G02B 27/30* (2006.01)

(52) U.S. Cl.
  CPC .......... *G02B 3/0037* (2013.01); *G02B 27/30* (2013.01); *F21S 41/322* (2018.01); *F21S 43/315* (2018.01); *F21S 43/40* (2018.01); *F21S 43/402* (2024.05); *F21V 5/002* (2013.01); *F21V 5/005* (2013.01)

(56) References Cited

U.S. PATENT DOCUMENTS

| | | | |
|---|---|---|---|
| 2003/0147244 A1 | 8/2003 | Tenmyo | |
| 2005/0174771 A1* | 8/2005 | Conner | F21V 5/008 |
| | | | 362/240 |
| 2005/0201100 A1* | 9/2005 | Cassarly | F21V 29/713 |
| | | | 362/317 |
| 2009/0097248 A1* | 4/2009 | Tsao | G02B 5/0278 |
| | | | 362/296.05 |
| 2012/0127710 A1* | 5/2012 | Jurik | F21V 11/16 |
| | | | 362/235 |
| 2013/0058103 A1* | 3/2013 | Jiang | F21V 13/04 |
| | | | 362/296.05 |

FOREIGN PATENT DOCUMENTS

| | | | | |
|---|---|---|---|---|
| DE | 112013000160 T5 | 5/2014 | | |
| DE | 102018118684 A1 | 2/2020 | | |
| EP | 2538260 A1 | 12/2012 | | |
| EP | 2587125 A2 * | 5/2013 | ............ | F21S 41/143 |
| WO | 2012171439 A1 | 12/2012 | | |
| WO | WO-2013154098 A1 * | 10/2013 | ............ | F21V 5/004 |
| WO | 2020148107 A1 | 7/2020 | | |

OTHER PUBLICATIONS

Machine translation of CN 1918498 A retrieved from the FIT database of PE2E search. (Year: 2024).*

Machine translation of EP 2587125 A2 retrieved from the FIT database of PE2E search. (Year: 2024).*

Machine translation of DE 102008027234 A1 retrieved from the FIT database of PE2E search. (Year: 2024).*

* cited by examiner

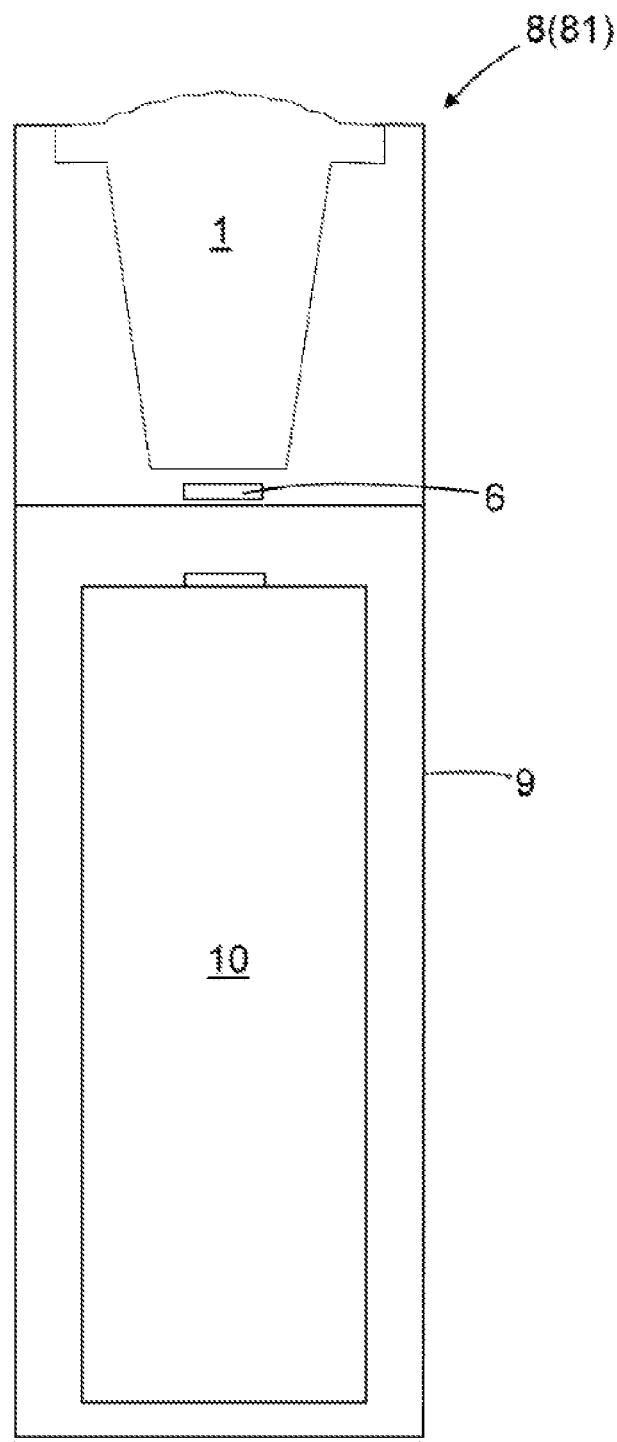

COLLIMATOR AND PORTABLE LIGHTING DEVICE

CROSS REFERENCE TO RELATED APPLICATIONS

This application is a United States National Phase Application of International Application, PCT/DE2022/100203 filed Mar. 15, 2022, and claims the benefit of priority under 35 U.S.C. § 119 of German Application DE 10 2021 108 747.3, filed Apr. 8, 2021, the entire contents of which are incorporated herein by reference.

TECHNICAL FIELD

The invention relates to a collimator for collimating light by means of a plurality of optical surfaces each forming optical boundary surfaces with a change in optical density, wherein the collimator has a substantially flat light entry surface, a convex light exit surface, and a totally reflective side wall connecting the light entry surface to the light exit surface.

The invention further relates to a portable lighting device having such a collimator.

BACKGROUND

Collimators for collimating light are known in the prior art, particularly in the context of portable or mobile lighting devices, wherein the various collimators have different geometries for different fields of application.

For example, lenses with a flat or concave light entry surface and a convex light exit surface are known.

Furthermore, so-called total internal reflection collimators (TIR collimators) are known, which comprise a converging lens and a reflector part that completely surrounds the converging lens. The light entry surface of such a TIR collimator is usually divided into two sections, namely a planar, convex or concave light entry surface of the converging lens and a substantially cylindrical light entry surface of the reflector part. The central converging lens and the reflector part also have different light exit surfaces, which is why TIR collimators usually have a complex geometry.

In addition, straight-walled light guides are known which are frustoconical in cross-section and designed with a flat light entry surface and a flat light exit surface.

A geometry comparable to that of a straight-walled light guide is provided by compound parabolic concentrator collimators (CPC collimators), which also have a flat light entry surface and a flat light exit surface, but whose side walls are of convex design.

Finally, collimators of this type are known as so-called dielectric total internal reflection collimators (DTIR collimators). In contrast to the known light guides and CPC collimators, DTIR collimators have a light exit surface that is of entirely convex design.

Although the known collimators allow the collimation of light, an ideal light distribution has not yet been achieved. An ideal light distribution is understood to be a light distribution which has an essentially constant or homogeneous light intensity within a predeterminable light cone, which intensity is free of reflections, lines and other rings with a locally deviating light intensity, and which has a clearly defined edge.

Outside the edge and thus outside the intended light distribution, the light intensity should disappear completely, if possible.

SUMMARY

It is therefore an object of the present invention to propose a collimator and a portable lighting device having a collimator that creates an improved light distribution.

This object is achieved by a collimator having collimator features according to this disclosure and having portable lighting device features according to this disclosure.

According to the invention, it is provided that the light exit surface of the DTIR collimator according to the claims comprises light-refracting structures. The light-refracting structures on the light exit surface of the DTIR collimator cause each light beam to leave the light exit surface with a small cone angle, which is, however, small compared to the cone angle of the overall light distribution. This does not enlarge the light cone of the overall light distribution, but local intensity maxima are effectively prevented, which are otherwise discernible as undesired local intensity maxima and/or intensity minima, for example in the form of rings, lines or other reflections without a definable geometry. The light-refracting structures thus cause a mixing of the light within the light cone, which is why within the light cone and consequently within the desired light distribution an essentially constant or homogeneous light intensity results both in the near range and in the far range.

The arrangement of the microlenses on the light exit surface of a DTIR collimator according to the claims results in a collimator with a comparatively compact design, which, compared to known collimators, is also associated with a small light exit surface. Furthermore, the collimator according to the invention is advantageously substantially etendue-limited.

Preferred embodiments of the present invention are described below.

Within the scope of a first advantageous embodiment of the invention, it is provided that the light-refracting structures are configured as concave and/or convex microlenses or as diffusely light-refracting structures. Concave and/or convex microlenses can be arranged on the light exit surface of the collimator in view of their geometry, number, arrangement and density in such a way that, even when taking into account the geometry of the collimator and the light source used, a homogeneous light distribution results within the radiated light cone. In this context, it is preferably provided that the microlenses are of spherical or aspherical design and are preferably arranged as a square, hexagonal, annular or phyllotaxic shape on the light exit surface of the collimator. In the context of spherical microlenses, a radius of curvature of 0.4 mm to 6 mm is preferably provided in each case, preferably of 0.75 mm to 3 mm, particularly preferably of 1 mm to 2 mm. This type of microlenses preferably has a diameter of 0.3 mm to 4 mm.

Within the context of another preferred embodiment of the invention, it is provided that the substantially flat light entry surface is flat, convex or concavely curved.

Within the context of an advantageous further development of the invention, said surface, regardless of the curvature of the light entry surface, is of polygonal, square or round design in cross-section.

Within the context of an advantageous embodiment of the invention, the surfaces of the microlenses may be substantially the same, i.e., the sizes of the surfaces may be substantially equal to the average of the surfaces or not significantly different therefrom. In such an embodiment, the radii of curvature of the microlenses may also be substantially identical.

Alternatively, in a preferred embodiment of the invention, it is provided that the microlenses have varying surfaces. In this case, the surface size of each microlens correlates with the radius of curvature of the respective microlens in such a way that the radius of curvature increases with increasing surface size. Thus, the radius of curvature is proportional to the surface size of the microlens. Preferably, the surface sizes and the radii of curvature are selected such that all microlenses have a substantially equiangular rising edge at the transition to the envelope of the light exit surface. Thus, smaller microlenses have an identical surface slope at the transitions to the envelope of the light exit surface compared to larger microlenses, so that comparatively smaller microlenses make an identical contribution to light mixing.

In an advantageous manner, the side wall of the collimator is of concave, convex or flat design in cross-section at least in sections, wherein a side wall, which is of concave design in cross-section, preferably is of spherical, aspherical, hyperbolic, parabolic, elliptical or Cartesian-oval shaped design, wherein the cross-sectional plane contains the optical axis of the collimator. In an advantageous further development, the side wall can also comprise several regions with a different curvature, for example a lower region with a concave curvature, which transitions into a region with a convex curvature via an inflection point. Regardless of the specific design of the side wall, the light is completely reflected there within the collimator and, after a first and possibly a further total reflection, reaches the light exit surface, where the light leaves the collimator via the refractive structures within a well-defined light cone. The refractive, concave light exit surface is thus designed in such a way that both the direct light, which reaches the light exit surface directly from the light entry surface, and the light reflected at the side walls exit completely. The light exit surface preferably has a spherical or aspherical curvature and is preferably of round, polygonal or square design in cross-section. A spherical light exit surface, or more precisely, an enveloping surface of spherical design of the light exit surface, preferably has a radius of curvature of 4 mm to 20 mm, preferably of 3 mm to 7 mm, particularly preferably a radius of curvature of 5 mm to 6 mm.

For fastening the collimator within a lighting device, in particular within a portable lighting device, the collimator has a retaining edge, at least partially or completely surrounding the light exit surface.

The collimator can consist of different transparent materials, wherein the collimator is preferably made of polycarbonate (PC), polymethyl methacrylate (PMMA), glass, cyclo-olefin copolymer (COC), cyclo-olefin polymer (COP), polymethacrylmethylimide (PMMI), or silicone.

Insofar as the collimator is the collimator of a portable lighting device with a light source, in particular a flashlight or headlamp, it is provided according to a preferred embodiment of the invention, that a distance is present between the light source and the light entry surface of the collimator, in particular a distance of 0.1 mm to 0.5 mm, which is wide enough to provide for sufficient heat dissipation and narrow to such an extent that allows the light to get from the light source to the light entry surface without significant power dissipation, where the light emitted by the light source is substantially completely collimated. Preferably, it is provided that the distance between the light entry surface of the collimator and the light source is smaller than or equal to 0.2 times the width of the light source. In this context, within the context of a particularly preferred embodiment of the invention, it is provided that the geometry of the light source is adapted to the geometry of the light entry surface in such a way that a) a light source with a square cross-section is assigned a light entry surface with a square cross-section, or
b) a light source with a round cross-section is assigned a light entry surface with a round cross-section, or
c) a light source with a polygonal cross-section is assigned a light source with a corresponding polygonal cross-section. This significantly reduces power losses and optimizes the radiation characteristics. The geometry of the light entry surface, on the other hand, is substantially independent of the geometry of the light exit surface, which in a plan view can also be square, polygonal or round, but correlation with the geometry of the light entry surface is not mandatory. In this respect, a square light entry surface can be assigned a round light exit surface. In all this, it is preferably provided that the light entry surface is of planar or flat design. Furthermore, the light entry surface has an area which is 1 to 2 times the area of the light source.

Finally, within the context of a further preferred embodiment of the invention, it is provided that the light source comprises one or more light source elements which preferably have a flat light exit surface. All the light sources mentioned are preferably configured as light-emitting diodes (LEDs). Accordingly, the light sources do not have a dome and are therefore of dome-free design. A dome is a spherical cupola made of a transparent synthetic material that covers the LED.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a view showing a portable lighting device having a collimator.

DESCRIPTION OF PREFERRED EMBODIMENTS

Figure 1:
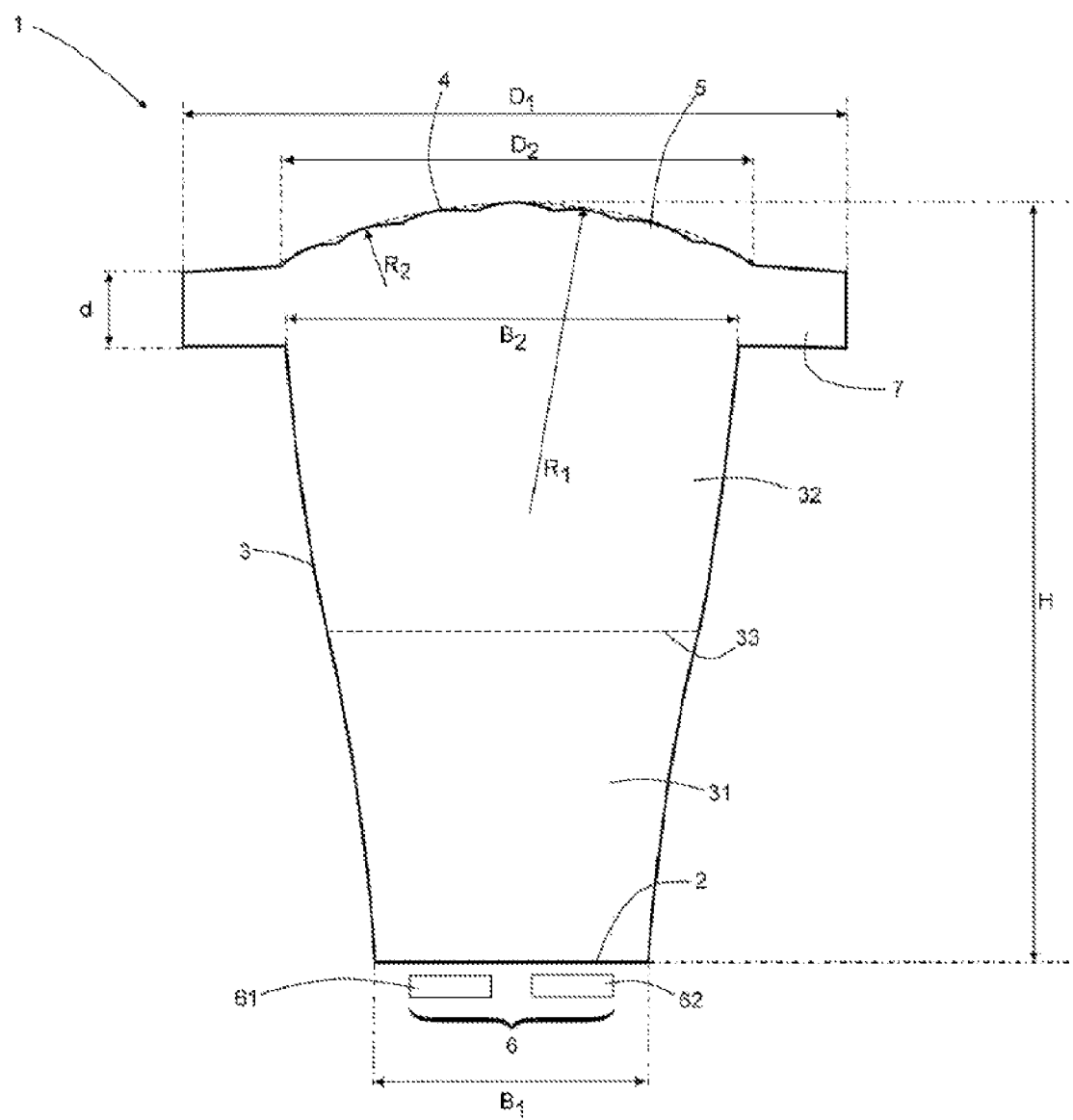
FIG. 1 is a cross-sectional view of a first collimator.

Referring to the drawings, FIG. 1 shows a first specific embodiment of a collimator 1 according to the invention in a cross-section. The collimator 1 has a completely flat and square light entry surface 2 with a width $B_1$ of 8.41 mm. The light entry surface 2 transitions directly into a cross-sectionally square light guide section with a side wall 3, which in the illustrated exemplary embodiment has a lower region 31 with a concave curvature and an upper region 32 with a convex curvature. Between the concave (lower) region 31 and the convex (upper) region 32 of the side wall 3, inflection points 33 are formed along the circumferential line at which a tangent applied to the side wall 3 changes sides. The collimator 1 has a convexly-spherical light exit surface 4 whose envelope (shown in dashed lines) has a radius of curvature $R_1$ of 16.5 mm. Convex microlenses 5 with a radius of curvature $R_2$ of 3.0 mm are arranged over the entire area of the light exit surface 4. The light exit surface 4 is surrounded, at least in sections, by a retaining edge 7, which has a thickness d of 1.96 mm and a diameter $D_1$ of 20 mm. The light exit surface 4 has a diameter $D_2$ of 14.1 mm at the transition to the retaining edge 7. At the transition between the light guide section with the side wall 3 and the retaining edge 7, the collimator 1 has a width $B_2$ of 14.0 mm. The total height H of the collimator 1 is 20.22 mm. The collimator 1 is assigned two light source elements 61, 62, which together form a light source 6 and which are arranged at a slight distance from the light entry surface 2 in such a way that the light emitted by the light source elements 61, 62 couples almost completely into the collimator 1.

Figure 2:
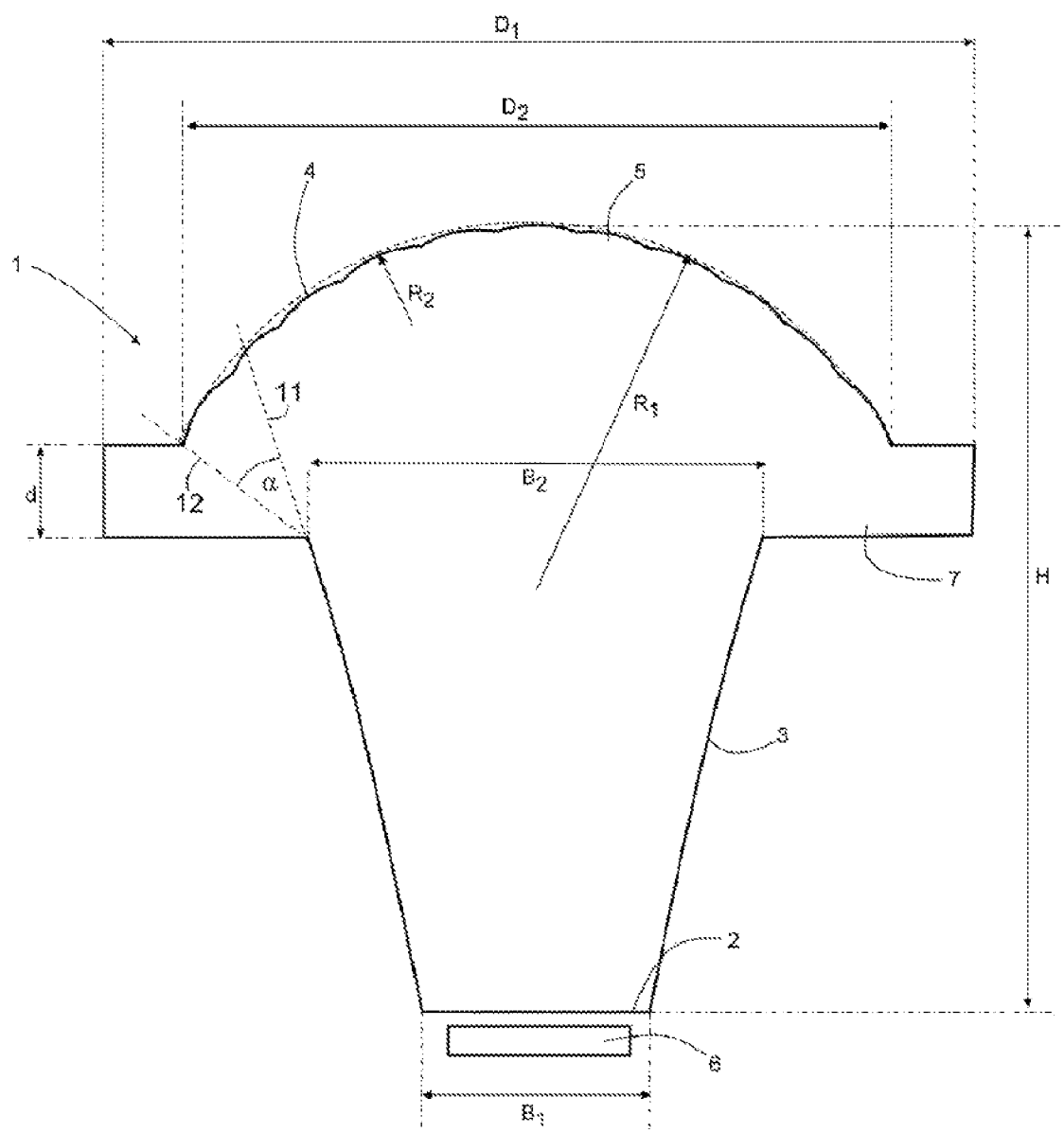
FIG. 2 is a cross-sectional view of a second collimator.

FIG. 2 shows a second specific embodiment of a collimator 1 according to the invention in a cross-section. The collimator 1 has a completely flat and square light entry surface 2 with a width $B_1$ of 2.64 mm. The light entry surface 2 transitions into a light guide section with a side wall 3, which in the illustrated exemplary embodiment is of completely concave design. In the illustrated exemplary embodiment, the radius of curvature of the side wall 3 is not constant and has a comparatively small radius of curvature in the lower region of the side wall 3, which becomes steadily larger towards the top, i.e., towards the light exit surface 4. The collimator 1 has a convex spherical light exit surface 4, the envelope (shown in dashed lines) of which has a radius of curvature $R_1$ of 4.95 mm. Convex microlenses 5 with a radius of curvature $R_2$ of 1.42 mm are arranged over the entire area of the light exit surface 4. The light exit surface 2 is surrounded, at least in sections, by a retaining edge 7, which has a thickness d of 0.91 mm and a diameter $D_1$ of 10.9 mm. The light exit surface 4 has a diameter $D_2$ of 8.14 mm at the transition to the retaining edge 7. At the transition between the light guide section with the side wall 3 and the retaining edge 7, the collimator 1 has a width $B_2$ of 5.22 mm. The total height H of the collimator 1 is 7.71 mm. The collimator is assigned 1 a light source 6, which is arranged at a slight distance from the light entry surface 2 in such a way that the light emitted by the light source 6 couples almost completely into the collimator 1.

In particular in the collimator 1 according to FIG. 2, an imaginary tangential extension 11 of the side wall 3 intersects the light exit surface 4. This means that a positive angle α is formed between the imaginary tangential extension 11 of the side wall 3 and a direct linear connection 12 of the edges of the light exit surface 4 and the side wall 3. In the embodiment shown, the angle α is 40.1°. This advantageously reduces potential losses of light output power.

Figure 3:
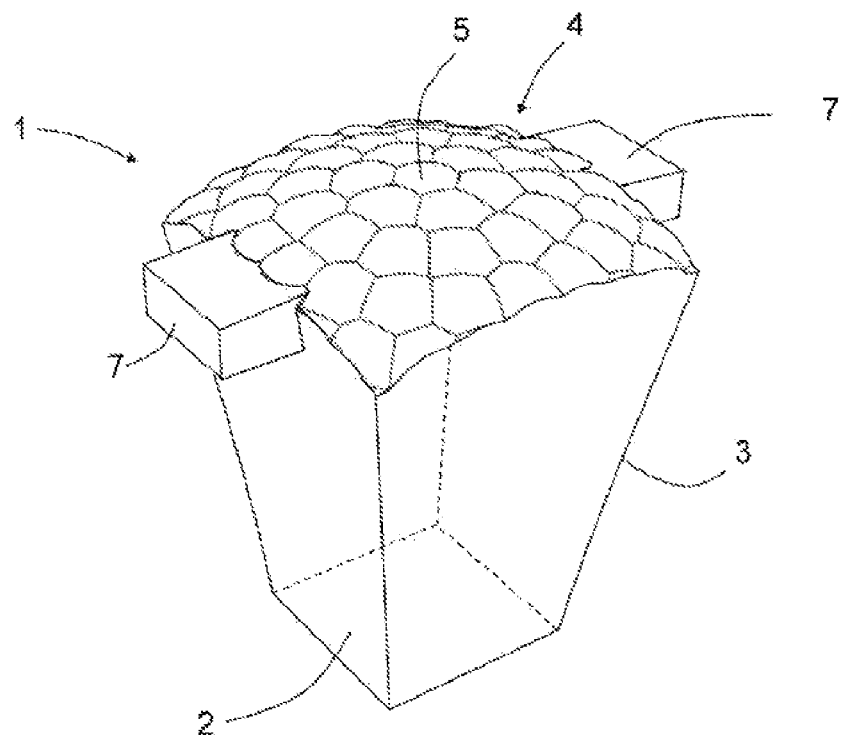
FIG. 3 and FIG. 4 are perspective illustrations of two collimators.

FIG. 3 shows a further embodiment of a collimator 1 according to the invention in a perspective view. The collimator 1 has a square light entry surface 2 and—in a top view—a likewise square light exit surface 4, which, however, outwardly forms a convexly spherical light exit surface 4 with microlenses 5 arranged thereon covering the entire surface. The light entry surface 2 transitions into a light guide section with the side wall 3. A retaining edge 7 is arranged on two opposite sides of the collimator 1, so that the retaining edge 7 surrounds the collimator 1 only in areas.

Figure 4:
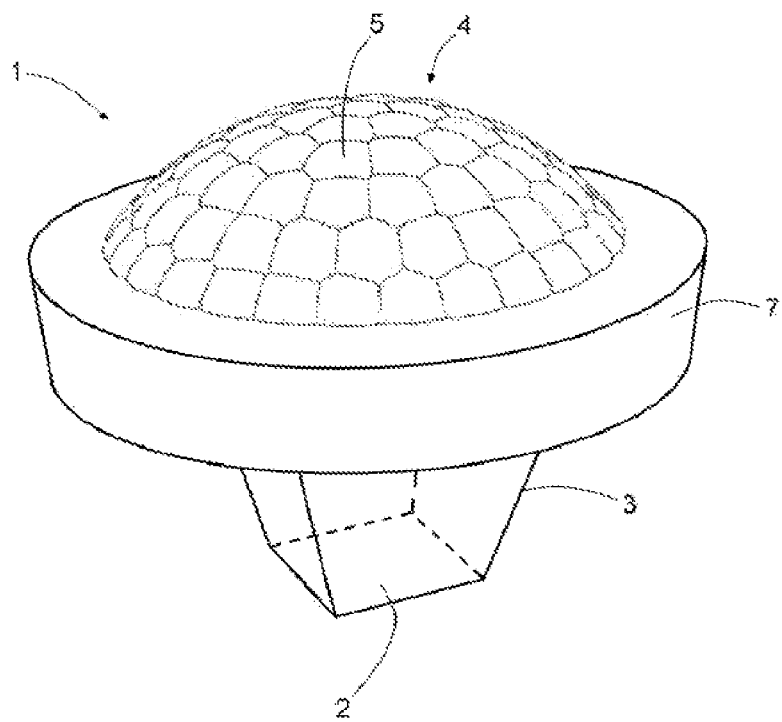

FIG. 4 shows a further embodiment of a collimator 1 according to the invention with a square light entry surface 2 and a light exit surface 4 of circular cross-section, which is completely surrounded by an annular retaining edge 7. The light entry surface 2 transitions into a light guide section with the side wall 3. The light exit surface 4 is also of convexly-spherical design and has convex microlenses 5 covering the entire surface.

Figure 5:
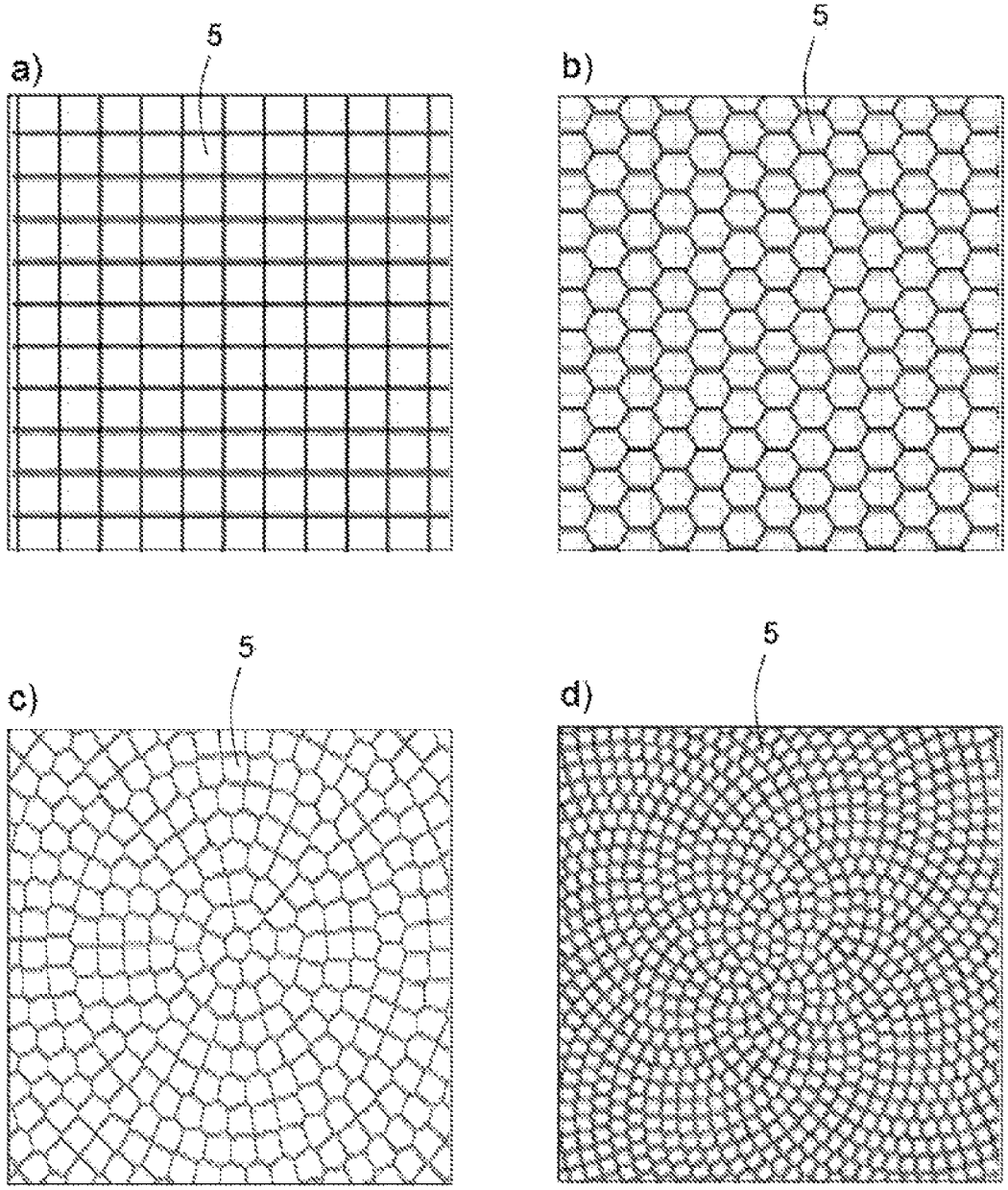
FIG. 5 is a view of different arrangements of microlenses.

The microlenses 5 can be arranged in different ways on the light exit surface 4 of a collimator 1. FIGS. 5a, b, c and d show different and preferred arrangements of the microlenses 5, which can be adapted to the geometry of the collimator and to the intended light distribution as required. FIG. 5a shows a squared arrangement of microlenses 5. FIG. 5b shows a hexagonal arrangement of microlenses 5. FIG. 5c is shows an annular arrangement of microlenses 5 and finally FIG. 5d discloses a phyllotaxic arrangement of microlenses 5.

A collimator 1 of the type described above is used in the context of a specific embodiment of the invention as a collimator 1 for a portable lighting device 8, in particular a flashlight 81. FIG. 6 shows in schematic view a cross-sectional view of a flashlight 81 with a collimator 1, a light source 6, a housing 9 and a power supply mounted therein in the form of a battery 10. The battery 10 is connected to control electronics (not shown) using which the instantaneous light output of the light source 6 can be controlled automatically or manually.

While specific embodiments of the invention have been shown and described in detail to illustrate the application of the principles of the invention, it will be understood that the invention may be embodied otherwise without departing from such principles.

REFERENCE CHARACTERS 1 collimator
2 light entry surface
3 side wall
31 lower region
32 upper region
33 inflection point
4 light exit surface
5 microlens
6 light source
61 light source element
62 light source element
7 retaining edge
8 lighting device
81 flashlight
9 housing
10 battery
11 tangential extension of the side wall
12 linear connection
α angle
$B_1$ width of light entry surface
$B_2$ width of side wall at the transition to the retaining edge
d thickness of retaining edge
$D_1$ diameter of retaining edge
$D_2$ diameter of light exit surface
H height of the collimator
$R_1$ radius of curvature of light exit surface
$R_2$ radius of curvature of microlens

The invention claimed is:

1. A collimator for collimating light by means of a plurality of optical surfaces each forming optical boundary surfaces with a change in optical density, the collimator comprising:
   only one light entry surface, the only one light entry surface being completely flat;
   a convex light exit surface;

a totally reflective side wall connecting the only one light entry surface to the light exit surface, wherein the light exit surface comprises light-refracting structures, wherein the light-refracting structures are configured as concave and/or convex microlenses; and a retaining edge surrounding the light exit surface.

2. The collimator according to claim 1, wherein the microlenses are of spherical or aspherical configuration and are arranged on the light exit surface of the collimator as a square, a hexagon, annularly or phyllotactically.

3. The collimator according to claim 1, wherein the microlenses comprise a spherical microlens that has a radius of curvature of 0.4 mm to 6 mm.

4. The collimator according to claim 3 wherein the radius of curvature is 0.75 mm to 3 mm.

5. The collimator according to claim 3 wherein the radius of curvature is 1 mm to 2 mm.

6. The collimator according to claim 1, wherein the only one light entry surface has a polygonal, square or round cross-section.

7. The collimator according to claim 1, wherein in cross-section the side wall is at least in sections of concave, convex or flat configuration, wherein the side wall having a concave configuration in cross-section is of spherical, aspherical, hyperbolic, parabolic, elliptical or Cartesian-oval shaped configuration, wherein a cross-sectional plane contains the optical axis of the collimator.

8. The collimator according to claim 1, wherein the light exit surface has a spherical or aspherical curvature and is of round, polygonal or square configuration in cross-section.

9. The collimator according to claim 8, wherein the light exit surface comprises a spherical light exit surface that has a radius of curvature of 4 mm to 20 mm.

10. The collimator according to claim 1, wherein:
all of the light-refracting structures are arranged to form a convex curve.

11. The collimator according to claim 1, wherein the collimator is comprised of polycarbonate, polymethyl methacrylate, glass, cyclo-olefin copolymer, cyclo-olefin polymer, polymethacrylmethylimide, or silicone.

12. The collimator according to claim 1, wherein:
all of the light-refracting structures are arranged to form one of a spherical and an aspherical arrangement.

13. The collimator according to claim 1, wherein:
a center of the only one light entry surface is aligned with a center of the light exit surface in a direction perpendicular to the only one light entry surface.

14. The collimator according to claim 1, wherein:
the light-refracting structures are configured as concave microlenses of a spherical design.

15. The collimator according to claim 14, wherein:
the concave microlenses are arranged as a square, hexagonal, annular or phyllotaxic shape on the convex light exit surface.

16. The collimator according to claim 1, wherein:
the concave and/or convex microlenses are arranged as a hexagonal, annular or phyllotaxic shape on the convex light exit surface.

17. A portable lighting device comprising:
a light source; and
a collimator having only one light entry surface, the only one light entry surface being completely flat;
a convex light exit surface; and
a totally reflective side wall connecting the only one light entry surface to the light exit surface, wherein the light exit surface comprises light-refracting structures, wherein the light-refracting structures are configured as concave and/or convex microlenses;
a retaining edge surrounding the light exit surface.

18. A portable lighting device according to claim 17, wherein a distance is present between the light source and the only one light entry surface of the collimator.

19. A portable lighting device according to claim 17, wherein a geometry of the light source is adapted to a geometry of the only one light entry surface that
the light source with a square cross-section is assigned the only one light entry surface with a square cross-section, or
the light source with a round cross-section is assigned the only one light entry surface with a round cross-section, or
the light source with a polygonal cross-section is assigned the light source with a corresponding polygonal cross-section.

20. The portable lighting device according to claim 17, wherein the light source comprises one or more light source elements which have a flat light exit surface.

21. The collimator according to claim 17, wherein:
the convex light exit surface has edges at the end of a curve of the convex light exit surface, the edges of the curve extend beyond an imaginary tangential extension of the side wall.

22. A collimator for collimating light by means of a plurality of optical surfaces each forming optical boundary surfaces with a change in optical density, the collimator comprising:
only one light entry surface, the only one light entry surface being completely flat;
a convex light exit surface; and
a totally reflective side wall connecting the only one light entry surface to the light exit surface, wherein the light exit surface comprises light-refracting structures, wherein the light-refracting structures are configured as concave and/or convex microlenses;
the side wall is adapted to have an imaginary tangential extension of the side wall intersect the light exit surface, so that a positive angle is formed between the imaginary tangential extension of the side wall and a direct linear connection of edges of the light exit surface and the side wall.

\* \* \* \* \*